United States Patent [19]

Geller

[11] Patent Number: 4,796,907
[45] Date of Patent: Jan. 10, 1989

[54] MUSCLE-POWER-DRIVEN VEHICLE

[76] Inventor: Herbert Geller, Maxburgstrasse 8, D-6701 Altrip, Fed. Rep. of Germany

[21] Appl. No.: 69,522

[22] Filed: Jul. 2, 1987

[51] Int. Cl.$^4$ .............................................. B62M 1/14
[52] U.S. Cl. ..................... 280/220; 280/117; 280/246; 280/255; 280/265; 280/267; 280/281 LP
[58] Field of Search .................... 280/220, 243, 242 R, 280/244, 246, 247, 251, 252, 253, 265, 267, 263, 281 LP, 255, 81 A, 86, 117, 114, 130, 133

[56] References Cited

U.S. PATENT DOCUMENTS

| 273,007 | 2/1883 | Baker | 280/267 |
| 422,087 | 2/1890 | Loser | 280/265 X |
| 2,049,345 | 7/1936 | Young | 280/243 X |
| 3,913,945 | 10/1975 | Clark | 280/243 |
| 4,305,600 | 12/1981 | Mendez | 280/243 X |
| 4,632,414 | 12/1986 | Ellefson | 280/281 LP X |
| 4,639,007 | 1/1987 | Lawrence | 280/244 X |
| 4,700,962 | 10/1987 | Salmon | 280/281 LP X |

FOREIGN PATENT DOCUMENTS 3534974  4/1987  Fed. Rep. of Germany .

Primary Examiner—David M. Mitchell
Assistant Examiner—Charles R. Watts
Attorney, Agent, or Firm—Berman, Aisenberg & Platt

[57] ABSTRACT

A chain-propelled vehicle is driven forward by pulling a spring-biased lever to which the chain is attached. The vehicle is steered by feet of an operator and has a steering-box geometry which imparts camber to a rear wheel when the vehicle negotiates a turn.

14 Claims, 3 Drawing Sheets

MUSCLE-POWER-DRIVEN VEHICLE

FIELD OF INVENTION

This invention relates to a muscle-power-driven vehicle, especially a three-wheel or four-wheel vehicle which can be moved forward by means of the simultaneous use of the arm and leg muscles.

BACKGROUND

A child's toy, called Irish Mail, permits a driver, with the help of a handle, to unwind a belt (rolled up on the vehicle's rear axle) via a return and to move the rear axle in the same direction of rotation, thus driving the vehicle itself. Steering is accomplished by means of the driver's feet via the front axle. High average speeds are not attainable with this vehicle.

SUMMARY OF THE INVENTION

An object of the invention is to create a vehicle with which one can drive faster, expending less force, and which can be operated in a mechanically reliable fashion for sports and therapeutic purposes under reproducible conditions.

The problem is solved with a muscle-power-driven, torsion-proof chassis, with front wheels that can be steered by a driver's feet, one or more axle-mounted rear wheels (which can be driven via the axle), and a saddle or seat, from which the rear wheel(s) can be driven via a chain drive connected with a lever hinged to the chassis. The chain drive engages a free-wheeling toothed rim, and comprises a chain piece having two ends, one of which is attached to the lever while the other end is connected with the chassis via a recovery spring. In the area in front of the lever a diversion or guide roller is provided to guide the chain piece between the lever and the toothed rim.

DETAILS

Figure 1:
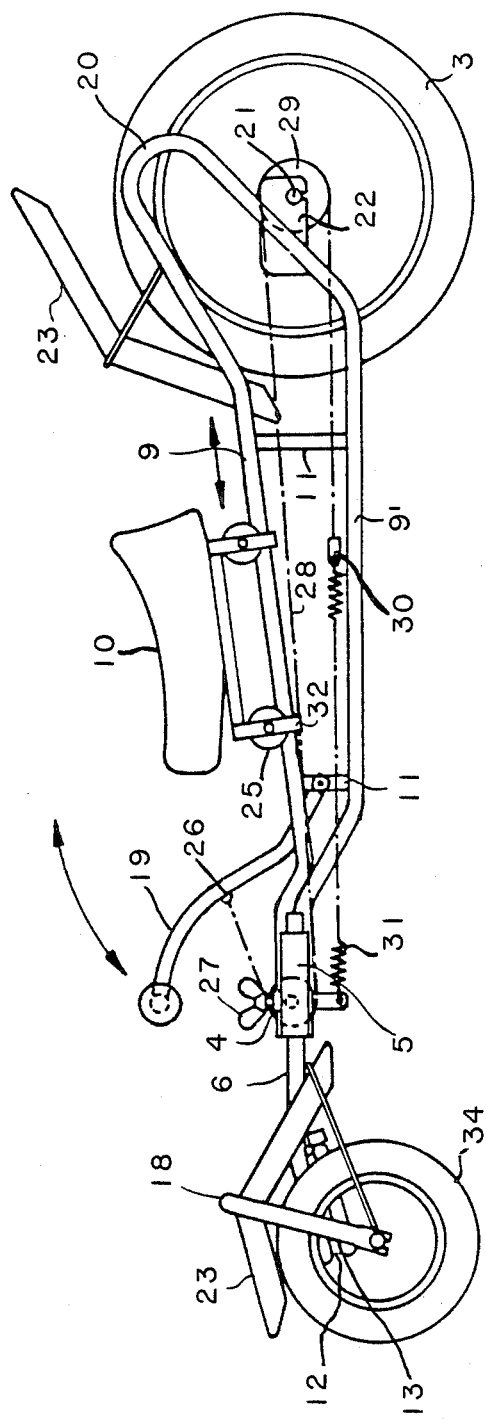
FIG. 1 is a side elevation of the vehicle.

To operate the vehicle, the lever is drawn from its forward position to the rear, toward the driver. In the process it takes along the chain via the diversion roller. The chain rolls over a toothed rim located around the rear wheel axle and drives the rear wheel in a manner similar to a bicycle. The end of the chain remote from the lever is attached to the chassis via a spring, which is drawn out in keeping with the lever movement.

The lever is moved up to its rear position near the driver and thereafter released back in a forward direction. The recovery spring, in the process, pulls the chain over the pinion of the free-wheeling toothed rim back into the starting position.

The chain is attached to the lever above its pivot bearing; it is pulled over a diversion or guiding roller which is positioned in front of the lever. In this arrangement, the ergonometry is particularly advantageous because the force expended during lever movement requires employment of maximum muscle power at the very moment when the operator's body position also permits the strongest development of force.

Because the force of the driver's arms can be considerably supplemented by bracing feet against the front axle and by means of a propping movement with the driver's thighs, surprisingly high sustained speeds can be achieved with the vehicle according to the invention.

Another advantage results from the fact that this type of muscle activity is particularly valuable in therapeutic terms. In order to maintain sufficiently long training or therapy intervals, it is possible, with this vehicle, to be motivated to achieve a supportive effect through the simultaneous forward movement or the joy derived from this movement.

In a particularly simple and stable fashion, the frame of the chassis consists of a type structure wherein longitudinal struts, which have the same size and shape and are thus symmetrical with respect to each other, are connected to each other by means of lateral bars. The lever is hinged to one such bar. The front and rear wheel axles are on the front and rear part, respectively, of the longitudinal struts. Foot supports are provided on a pivotable carrier connected to the front wheel axles.

Because of the attainable speeds, the vehicle has a particularly torsion-proof frame and steering structure, which reduce the danger of falling over along sharp curves which are negotiated at high speeds. According to the invention this is achieved with a frame preferably having one-piece pipe segments assembled to form two sidewalls, said pipe segments being held via spacing members and between which the rear wheel and the diversion roller are positioned. Both sides of the frame are fastened, at the front of the vehicle, to a loop or yoke, on which the vehicle's front axle is arranged in a steerable manner via a rotatable bearing. To incline the axis of the rotatable bearing, the loop is bent down and rests on a plate bearing.

The sidewalls of the frame run on both sides from the rear wheel forward to the front axle mounting and thus form a chain box which is optionally covered up to improve the visual impression. This results in a frame with a square cross-section and having a box profile, which is highly torsion-proof.

The fastening means comprise, for example, sleeves which are welded on the sidewalls, and in which the loop or yoke ends are held in a longitudinally movable and adjustable manner with the help of clamping screws.

A forward bend in the loop is readily brought about by any conventional means. The forward part of the sidewalls are optionally also inclined obliquely down, so that the bearing plates which support the loop or the rotation axis of the plates is likewise disposed in an inclined manner, thus bringing about a changeable camber of the rear wheel, which depends on the angle of lock or position of the front axle, because the rear wheel (together with the entire frame) is inclined toward the inside of any curve negotiated by the vehicle. The driver thus leans into a curve at an angle predetermined by the steering geometry; the force of gravity and the centrifugal force result in a vector which is almost constantly perpendicular to the rear wheel axle and thus guarantees surprisingly increased driving stability.

The upper struts of the two lateral sidewalls are made parallel between the pivot point of the lever and the rear wheel and thus in a simple manner form rails for a rolling seat.

These struts preferably rise slightly toward the rear in a straight or curved manner so that rear positioning of the rolling seat can be accomplished without the use of force, that is to say, by means of the force of gravity.

The plate bearing according to the invention contributes considerably to driving stability and to driving comfort; it is held together by the driver's weight without any leeway. Surprisingly enough, a simple grease packing is sufficient for permanent lubrication.

The bearing consists of two superposed plates, one of which rests on top of the other with a common middle rotation axle, whereby the rotating bearing consists of two superposed plates with a common axis. The upper plate is directly connected to the loop or yoke, and the lower plate is attached to the front axle through a forward carrier, and a rear carrier with a foot support arranged on the latter.

The axle of the plate bearing is advantageously provided with a gear via which, with the help of a properly fitting nut, the plates are optionally pressed upon each other in order to generate a desired adjustable steering resistance.

The use of the plate bearing in conjunction with the forward and rear carriers of the front axle provides a very broad surface and a very stable front axle bearing. The lower plate of the plate bearing rests in a peripheral fashion on the carriers, and the upper plate is surrounded by the roughly U-shaped loop or yoke. This structure is the key to one aspect of the invention.

The front wheels are positioned in forks. As a result of the slanted position of the plate bearing, additional stability of the entire wheel bearing or the front axle is facilitated. The fork is held on the forward and rear carriers, between which is a horizontal interval that is determined roughly by the inclination of the bearing. Both carriers are optionally banked together for this purpose; the fork preferably protrudes in a manner inclining toward the rear and away from the perpendicular. Protecting pieces of sheet metal and other driving safety devices, such as lamps or wheel brakes or the like, are optionally arranged on the forks.

To reduce the entire structural length, the lever is optionally offset forward above the chain attachment point, as a result of which the handles of the lever, in the starting position, that is to say, when the lever is in the foremost position protrude beyond the chain diversion roller. In the starting position, i.e., when the lever is in the forwardmost position, the chain runs roughly horizontally from the diversion roller to its attachment point on the lever and, in case of corresponding deflection, reaches an angle of 45° above the lever bearing. As for the rest, the lever can also be so made (in a conventional manner) that it can be adjusted in length.

The sidewalls are preferably made in one piece, each, and in the area of the rear wheel, they are arc-shaped to protect the spokes of that wheel. They run to a point in front of the lever bearing as a box-profile frame. Their ends are brought together in front and are welded together with each other. In this area, the chain diversion roller is held, and the fastening means for the front axle are arranged.

For added security of the clamp connection, the strut doubling segments, as well as the lower struts, are kept horizontal, and only the yoke or loop (which can be attached to the latter) has a bend of, e.g., from 15° to 25°, preferably about 20°, which is required to impart camber to the rear wheel when negotiating turns.

Essential support for exercising body muscles is additionally brought about by arranging the saddle or seat on rails in a movable manner so that, as the legs are stretched out, the saddle can move opposite to the direction of driving.

The return of the saddle is readily accomplished by pulling the legs up (and by making an angle with them toward the body), for which purpose foot loops are optionally provided on the front axle or in association with the foot supports.

An ergonomically better solution, however, is considered to reside in having the rails run, in the direction of driving, either inclined down or in a curve form.

The resultant additional work required to the lift the saddle during backward movement is minor and is accomplished as a result of the stretching movement of the leg muscles which, on the whole, is easier than the pure forward pulling of the saddle in a horizontal plane.

If desired, the rails are further provided with forward and rear stops in order to limit the movement of the saddle or seat. The saddle is also secured against being lifted off and optionally has a biasing support.

The lever has handles on both sides at the upper end on which a handle for, e.g., a Bowden-wire-activated rear wheel brake is optionally attached. The latter is advantageously of an appropriate size to accomplish safe braking.

The chain segment is optionally arranged on the lever so that its height is adjustable. This makes it possible to vary the amount of muscle power required for operation.

A conventional bicycle hub gear shift is optionally attached on the rear wheel. The height adjustability, however, can also be used as a gear shift. Here, the chain end rests on the lever in a sliding rail or sliding sleeve which, via a pulling device, a handle, or the like, can be adjusted in terms of height so that it will engage. In the process, the required arm power increases with the increasing height of the chain attachment on the lever; at the same time, a longer distance is covered with each lever movement and this corresponds to the different sizes of pinions of a chain shift.

On the side of the lever facing toward the driver, markings or a scale is optionally provided to indicate the suspension points of the chain on the lever and the corresponding stressing steps; these simultaneously correspond to the particular gears.

The stressing steps serve for therapeutic or training purposes in correlation with the speed at which the vehicle is driven.

Particularly good running properties according to the invention result from the fact that a considerably larger diameter is selected for the rear wheel or rear wheels than for the front wheels. This property is further supported by the fact that the overall center of gravity is near the rear axle. A three-wheel version with only one rear wheel is preferred.

The length of the lever itself is optionally adjustable. Any adjustment is made either above the adjustable suspension points or below them. In the latter case, the stress level as a whole is raised; this is particularly advantageous for young people. A longer lever length is favored by adult persons.

The interval between the diversion roller and the bearing of the lever is also optionally changeable. In combination with the one or more of the optional features, a very accurate adjustment of the lever drive to the physical dimensions and physical strength of the driver is achieved in order to administer therapeutically-intended training or to optimize the use of power.

The following geometry is merely exemplary, but is particularly advantageous: length of lever: 450 mm; number of teeth: 14; rear wheel diameter: 20 inches; front wheel diameter: 12.5 inches; inclination of saddle rail: 3%; axle interval: 1.4 to 1.6 m.

As shown in FIG. 1, the vehicle's frame consists of the two lateral sidewalls 1 and a forward adjoining yoke or loop 6. The sidewalls are connected to each other by means of horizontal spacing members 2 (FIG. 2), and braces 11 provide support in the rear part of the frame.

The sidewalls 1 are bent (20) loop-like in the area of rear wheel 3 and thus form a ramming or spoke shield. Sidewalls 1 support the rear wheel axle 21 through plates 22, attached to the frame for this purpose. A sheetmetal shield 23 is optionally attached to the loop 20 with wire clamp 24.

The lower strut 9' of cheek 1 is designed somewhat horizontally, for example, in order to facilitate sliding on obstacles in the terrain. The upper struts 9 run parallel to each other and rise to the rear in the form of a curve or, as illustrated, in a linear manner and form rails for the seat or saddle 10, which is positioned on rollers 25.

Seat 10 is movable (backward and forward) as the lever 19 is pulled back in order to enable an operator to retain the most favorable possible arm position while pulling.

Lever 19 is positioned in an easily swingable manner on two supports 11', which connect struts 9 and 9'. It is furthermore offset forward and has a chain attachment 26.

In front, struts 9 and 9' are brought together and are welded together as they rest upon each other; on the outside they carry sleeves 5 as an attachment means with wing clamping screws. The diversion roller 4 is positioned between the two side pieces 1 of the frame at which the struts are welded together. The roller consists of a grooved synthetic material wheel, for example, one made of polyethylene, as a result of which good noise attenuation is achieved.

Chain 28 is guided around diversion roller 4, starting from the chain attachment 26. It runs around drive pinion 29, from top to bottom. It ends at the chain connection 30 and is connected with the frame via a recovery spring 31 in a suitable manner.

Seat supports 32 grasp the upper strut 9 slightly in order to secure the seat against being lifted off. They can be made flexible in order to dismantle the saddle.

The ends of yoke 6 (representing the forward frame part in an adjustable manner in terms of length) rest in sleeves 5 and are retained in the clamping seat by wing screws 27. Yoke or loop 6 is bent down in a forward direction and rests on plate bearing 12, 13; it is welded together with the upper plate 12 along the support.

A front wheel fork 18, with a sheetmetal shield 23 optionally attached to it, is illustrated; it carries axle 33 of front wheel 34.

Figure 2:
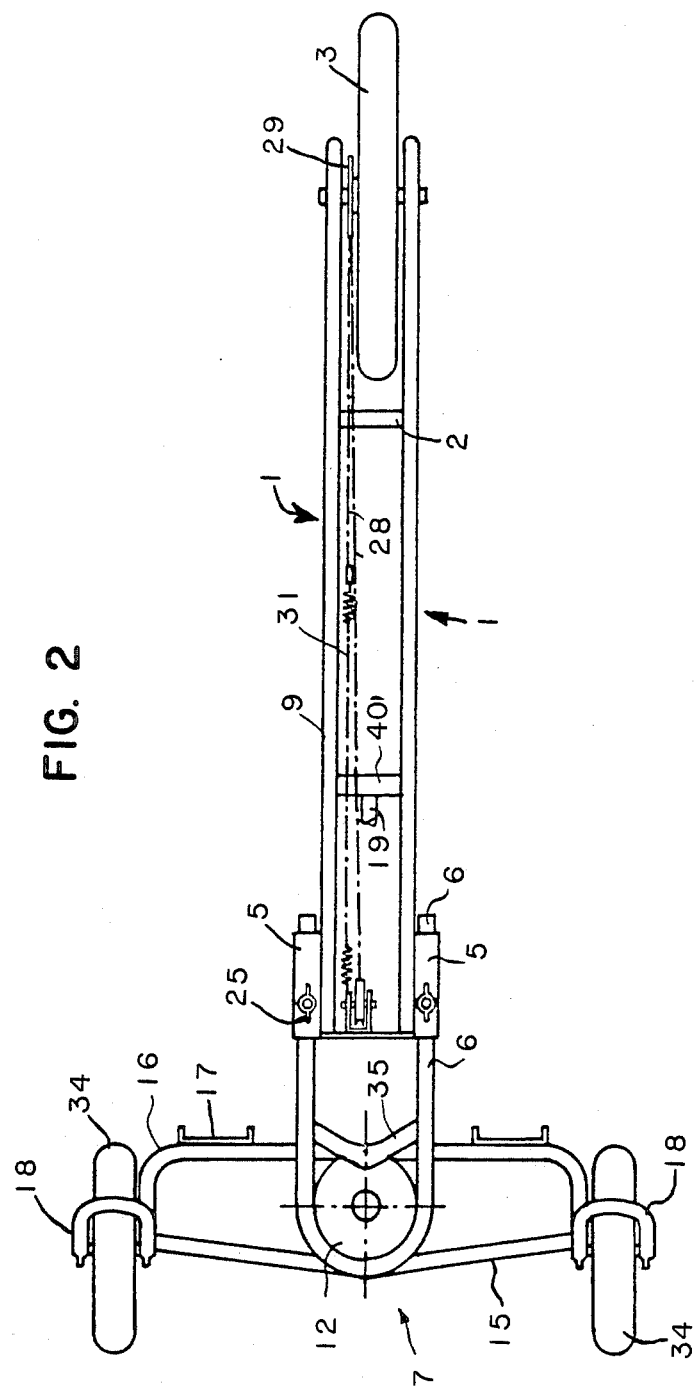
FIG. 2 is a plan view of the vehicle.

FIG. 2 shows the upper struts 9 which are connected with the help of spacing members 2; lower struts 9' of the sidewalls are similarly connected to each other.

Also shown are rear wheel 3, pinion 29, chain 28, recovery spring 31, and lateral bushings or sleeves 5 (with wing screws 27) in which the ends of yoke 6 are arranged in a movable and fixable manner. Yoke 6 is firmly connected to the upper plate 12 of the rotatable bearing in a peripheral fashion. In addition, a V-shaped support 35 is welded to yoke 6; to increase stability, it also rests on plate 12 and is likewise welded to the latter.

The front carrier 15 and the rear carrier 16 (with foot supports 17) are attached to the subjacent bearing plate 13. They end (on the outside) at the front wheel forks 18 (which grasp and position the front wheels 34) and are connected with them.

Figure 4:
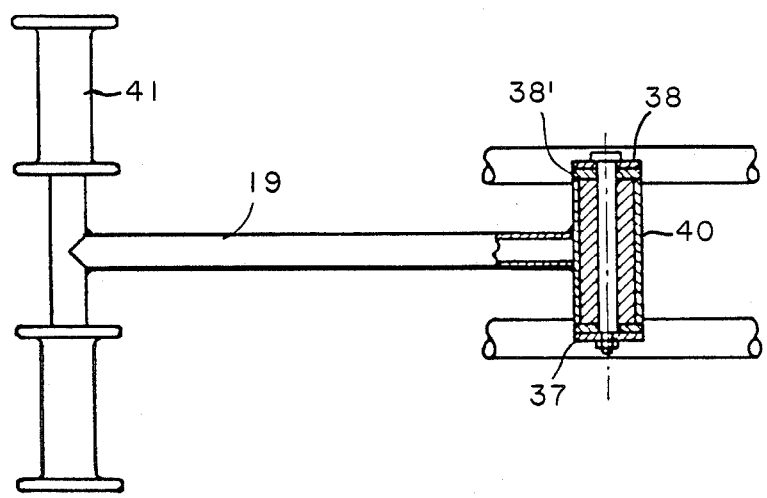
FIG. 4 is a plan view of the lever with a partial cross section through its bearing axle.

Lever 19 has a bearing 38 surrounded by external sleeve 40, which is welded to lever 19 (see FIG. 4). The sleeve is rotatably positioned between corresponding supports 11' FIG. 1). Disks 39, 39' are provided at each end of bearing 38 within sleeve 40.

Figure 3:
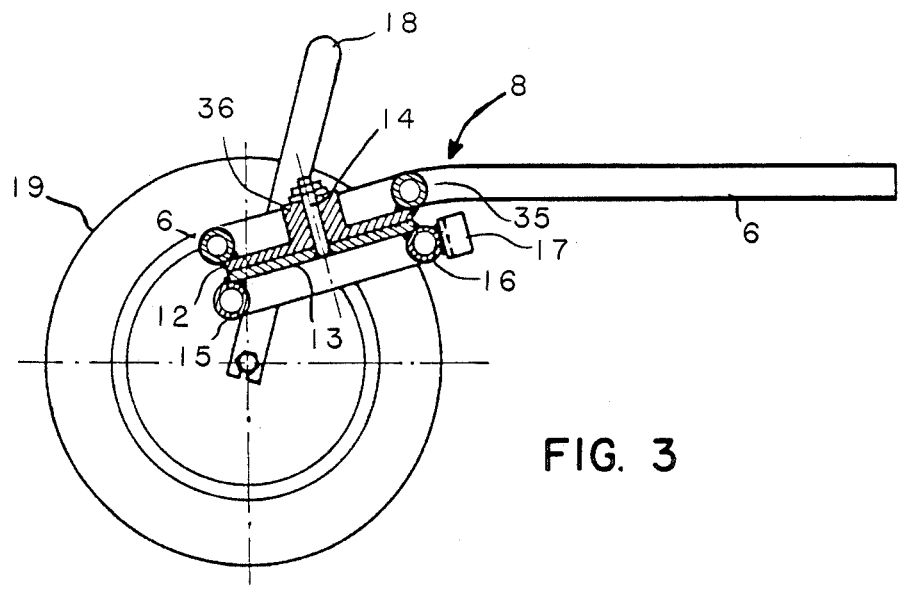
FIG. 3 is a cross section through the steering axis and shows the steering geometry of the front axle.

FIG. 3 illustrates the guidance of the front axle in cross-section. Yoke 6 rests on the upper plate 12, as does V-piece 35 which is welded (near the bend 8) to the shanks of yoke 6.

Front carrier 15 and rear carrier 16 support the lower plate 13 and, for example, in the plane of the illustration, end at fork 18, to which they are welded. The upper plate has bearing pin 36 in which the steering axle 14 is positioned in a torsion-proof manner. Steering axle 14 is welded to lower plate 13.

The steering axle 14 is inclined forward, out of the perpendicular, by the dimension of bend 8, and brings about a corresponding camber of the rear wheel from the perpendicular position into an inclined position (inclining increasingly into the interior of the curve) during the turning of the front axle with the help of foot supports 17.

FIG. 4 shows lever 19 in a top view. The lever is arranged between the struts (FIG. 1, FIG. 2) and is positioned in an easily running synthetic material bearing. Here, the bearing axis 37 is surrounded by a round synthetic material block 38 which is guided laterally with the help o disks 39, 39'. Block 38 is enclosed by a metal sleeve 40 on which is arranged lever 19, with handles 41.

The invention and its advantages are readily understood from the foregoing description. Various changes may be made in the form, construction, and arrangement of parts without department from the spirit and scope of the invention or sacrificing its material advantages. The described and illustrated structures are merely indicative of preferred embodiments.

What is claimed is:

1. A muscle-power-driven vehicle comprising chassis with a frame and two front wheels at one end, footoperable means to guide the vehicle, a front axle, yoke, at least one drivable rear wheel having an axle, a seat, a lever which is pivoted on the chassis, a toothed rim, which is free-wheeling in one direction, surrounding the drivable rear wheel axle, chain-drive means for at least one rear wheel, said chain-drive means engaging the free-wheeling toothed rim and having two ends, one of which is attached to the lever and the other of which is connected, via a recovery spring, to the chassis, and guiding roller means around which the chain-drive means traverses at a position intermediate the end attached to the lever and said free-wheeling toothed rim;

the frame comprising two one-piece pipe segments which are substantially alike and parallelly disposed, between which is positioned the rear wheel and the guiding roller means, which are joined together by spacing members, the two one-piece pipe segments comprising upper struts and lower struts, the upper struts being in the form of rails which support rollers on which the seat is mounted.

2. A vehicle according to claim 1 wherein the frame has means for separately fastening rotation plate bearing comprising two rotatable bearing plates, one of which is attached to said yoke and the other of which is secured to the front axle, which is connected to the foot-operable means, the two rotatable bearings lying in a plane which is at an acute angle to a horizontal plane and perpendicular to a plane parallel to the one-piece pipe segments, said bearing plate having a forward edge and a rearward edge, said forward edge being close to the front axle and significantly lower than said rearward edge.

3. A vehicle according to claim 1 wherein the attachment of the chain drive means to the lever is adjustable along the lever.

4. A vehicle according to claim 1 wherein the lever has front and rear stop limitations.

5. A vehicle according to claim I having a gear shift on the rear wheel.

6. A vehicle according to claim 1 wherein there is an interval between a location at which the lever is pivoted on the chassis and the guiding roller means and wherein the interval is adjustable.

7. A vehicle according to claim 1 wherein the upper and lower struts rise at the end of the chassis closest to the rear wheel.

8. A vehicle according to claim 7 wherein the two rotatable bearing plates comprise upper and lower superposed plates which have a common axis, and the means associated with the front wheels comprise a front carrier and a rear carrier, the front carrier having two ends, each of which is connected to a corresponding end of the rear carrier, and both the front carrier and the rear carrier are secured to the lower bearing plate.

9. A vehicle according to claim 8 having two forks, each attached to the front carrier at a different end and extending over and around one of the front wheels, and each attached, at an interval above the attachment to the front carrier, to the rear carrier at a different end.

10. A vehicle according to claim 9 wherein the lever includes an upper portion and a lower portion, said upper portion of said lever is offset forwardly from said lower portion of said lever.

11. A vehicle according to claim 9 wherein each one-piece pipe segment has two ends which are connected to each other and on which the yoke fastening means are secured.

12. A vehicle according to claim 11 wherein the yoke is bent downwardly in a forward direction at an angle of about 20°, thus imparting a similar inclination to the rotatable bearing plates.

13. A vehicle according to claim 11 wherein chain drive means is attached to the lever by means by which the height of attachment along said lever is adjustable.

14. A vehicle according to 13 wherein the lever has a side facing the operator on which is attached a scale which corresponds to the points of attachment of the chain drive means along the height of the lever.

* * * * *